United States Patent
Kim et al.

(10) Patent No.: US 12,423,224 B2
(45) Date of Patent: Sep. 23, 2025

(54) FLASH-BASED STORAGE DEVICE AND COPY-BACK OPERATION METHOD THEREOF

(71) Applicant: KOREA ADVANCED INSTITUTE OF SCIENCE AND TECHNOLOGY, Daejeon (KR)

(72) Inventors: Johndongjun Kim, Daejeon (KR); Jiho Kim, Daejeon (KR); Myoungsoo Jung, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 88 days.

(21) Appl. No.: 17/819,347

(22) Filed: Aug. 12, 2022

(65) Prior Publication Data

US 2023/0350797 A1    Nov. 2, 2023

(30) Foreign Application Priority Data

Apr. 27, 2022    (KR) .......... 10-2022-0052357

(51) Int. Cl.
G06F 11/00    (2006.01)
G06F 11/07    (2006.01)
G06F 12/02    (2006.01)

(52) U.S. Cl.
CPC ........ G06F 12/0246 (2013.01); G06F 11/073 (2013.01); G06F 11/0793 (2013.01); *G06F 2212/7208* (2013.01)

(58) Field of Classification Search
CPC ............. G06F 11/073; G06F 11/0793; G06F 11/1044; G06F 12/0246; G06F 12/0253
See application file for complete search history.

(56) References Cited

U.S. PATENT DOCUMENTS

| | | | |
|---|---|---|---|
| 9,378,097 B1* | 6/2016 | Bellorado | G11C 29/52 |
| 10,228,858 B1* | 3/2019 | Stoakes | G06F 3/0641 |
| 10,289,321 B1* | 5/2019 | Baryudin | G06F 3/064 |
| 10,866,858 B2* | 12/2020 | Berman | G11C 29/52 |

(Continued)

FOREIGN PATENT DOCUMENTS

KR    10-2017-0003776    1/2017

OTHER PUBLICATIONS

Kim, Jiho, Myoungsoo Jung, and John Kim. "Decoupled SSD: Reducing Data Movement on NAND-Based Flash SSD." IEEE Computer Architecture Letters 20.2 (2021): 150-153, Oct. 8, 2021.

(Continued)

*Primary Examiner* — Elmira Mehrmanesh
(74) *Attorney, Agent, or Firm* — LEX IP MEISTER, PLLC

(57) ABSTRACT

A flash memory device of a flash-based storage device includes a plurality of flash buses and a plurality of flash memory chips, and each flash bus is connected to two or more flash memory chips among the flash memory chips. A front-end includes a processing core, and a plurality of flash controllers are respectively connected to the flash buses. Each flash controller includes a flash controller logic configured to perform a read operation or a write operation in a flash memory chip connected to a corresponding flash bus among the flash buses, and a router configured to perform communication with another flash controller among the flash controllers.

17 Claims, 13 Drawing Sheets

(56) References Cited

U.S. PATENT DOCUMENTS

| | | | | |
|---|---|---|---|---|
| 2009/0172498 | A1* | 7/2009 | Shlick | G06F 11/1064 |
| | | | | 714/764 |
| 2011/0161784 | A1* | 6/2011 | Selinger | G06F 11/1016 |
| | | | | 714/E11.002 |
| 2011/0283166 | A1* | 11/2011 | Kim | G06F 11/106 |
| | | | | 714/E11.034 |
| 2013/0055047 | A1* | 2/2013 | Sharon | G11C 29/52 |
| | | | | 714/764 |
| 2013/0159815 | A1* | 6/2013 | Jung | G06F 12/00 |
| | | | | 714/763 |
| 2017/0083436 | A1* | 3/2017 | Jung | G06F 12/0246 |
| 2017/0132074 | A1* | 5/2017 | Zhang | G06F 11/1068 |
| 2019/0130951 | A1 | 5/2019 | Huen et al. | |
| 2019/0196901 | A1 | 6/2019 | Arbel et al. | |
| 2020/0320001 | A1 | 10/2020 | Choi | |
| 2023/0106125 | A1* | 4/2023 | Chung | H03M 13/353 |
| | | | | 714/764 |

OTHER PUBLICATIONS

Tavakkol, Arash, Mohammad Arjomand, and Hamid Sarbazi-Azad. "Network-on-SSD: A scalable and high-performance communication design paradigm for SSDs." IEEE Computer Architecture Letters 12.1 (2012): 5-8, Mar. 28, 2012.

Yan, Shiqin, et al. "Tiny-tail flash: Near-perfect elimination of garbage collection tail latencies in NAND SSDs." ACM Transactions on Storage (TOS) 13.3 (2017): 1-26, Aug. 2017.

* cited by examiner

FLASH-BASED STORAGE DEVICE AND COPY-BACK OPERATION METHOD THEREOF

CROSS-REFERENCE TO RELATED APPLICATION

This application claims priority to and the benefit of Korean Patent Application No. 10-2022-0052357 filed in the Korean Intellectual Property Office on Apr. 27, 2022, the entire contents of which are incorporated herein by reference.

BACKGROUND

(a) Field

The disclosure relates to a flash-based storage device and a copy-back operation method thereof.

(b) Description of the Related Art

A bandwidth of a flash (e.g., NAND flash)-based storage device (e.g., a solid-state drive, SSD) has increased with improvement in a flash memory technology and a high-speed interface protocol. To support the high bandwidth of input/output (I/O) read/write requests, internal parallelism of the SSD is exploited and multi-plane commands enable additional bandwidth through the multiple planes. SSD firmware translates high-level I/O requests (or logical address) to low-level I/O requests (or physical addresses) and sends the low-level I/O requests (i.e., commands) to a flash controller to handle I/O operations. As a result, in addition to the flash memories, other system resources such as a core, a DRAM, and a system bus are also heavily utilized during the I/O operations. However, in addition to the I/O requests, garbage collection uses the same resources when valid pages are copied to free blocks.

Since both the I/O requests and the garbage collection use the same resources, conflicts between the two may impact overall performance and throughput. To address these conflicts, most prior work has focused on flash memory conflicts because of long latency of the flash memory. However, system resources (particularly, system bus) are emerging as a more critical bottleneck because of increase in the unit of data transfer per plane and also the increasing number of planes. As a result, increasing page size and the larger number of planes may not only increase flash memory parallelism and thus bandwidth but also impact the utilization of the system resources, in particular the system bus, and the I/O requests may be heavily impacted by the garbage collection.

SUMMARY

Some embodiments of the present invention may provide a flash-based storage device a copy-back operation method thereof, for reducing unnecessary system resource use of a flash controller.

According to an embodiment of the present invention, a flash-based storage device including a flash memory device, a front-end, and a plurality of flash controllers may be provided. The flash memory device may include a plurality of flash buses and a plurality of flash memory chips, and each of the plurality of flash buses may be connected to two or more flash memory chips among the plurality of flash memory chips. The front-end may include a processing core, and the plurality of flash controllers may be connected to the plurality of flash buses, respectively. Each of the plurality of flash controllers may include a flash controller logic configured to perform a read operation or a write operation in a flash memory chip connected to a corresponding flash bus among the plurality of flash buses, and a router configured to perform communication with another flash controller among the plurality of flash controllers.

In some embodiments, the front-end may further include a system bus configured to connect the processing core and the plurality of flash controllers. The front-end and the flash memory device may be decoupled to allow the flash controllers and the flash memory device to perform a predetermined operation without utilizing a system resource including the system bus.

The predetermined operation may include an operation using a copy-back command during garbage collection.

In some embodiments, the plurality of flash controllers may be connected by a separated network-on-chip (NoC).

In some embodiments, each of the plurality of flash controllers may further include an error correction code (ECC) logic configured to perform error detection or error correction on a page read by the flash controller logic.

In some embodiments, in response to the processing core issuing a copy-back command to a target flash controller among the plurality of flash controllers during garbage collection, the flash controller logic of the target flash controller may read a target page from a target flash memory chip among the plurality of flash memory chips, the ECC logic of the target flash controller may perform the error detection on the target page, and the flash controller logic of the target flash controller may write the target page to a free block of the target flash memory chip.

In some embodiments, in response to the processing core issuing a copy-back command to a target flash controller among the plurality of flash controllers during garbage collection, the flash controller logic of the target flash controller may read a target page from a source flash memory chip among the plurality of flash memory chips, the ECC logic of the target flash controller may perform the error detection on the target page, and the flash controller logic of the target flash controller may write the target page to a free block of a destination flash memory among the plurality of flash memory chips.

In some embodiments, in response to the processing core issuing a copy-back command to a source flash controller among the plurality of flash controllers during garbage collection, the flash controller logic of the source flash controller may read a target page from a source memory chip among the plurality of flash memory chips, the ECC logic of the source flash controller may perform the error detection on the target page, the router of the source flash controller may send the target page to the router of a destination flash controller among the plurality of flash controllers, and the flash controller logic of the destination flash controller may write the target page to a free block of a destination flash memory chip among the plurality of flash memory chips.

In some embodiments, the router of the source flash controller may packetize the target page to generate a packet, and send the packet to the router of the destination flash controller.

In some embodiments, the plurality of flash controllers may include a first flash controller and a second flash controller. The flash-based storage device may further include an ECC logic configured to be shared by the first flash controller and the second flash controller and perform error detection or error correction on a page read by the first flash controller logic or the second flash controller logic.

In some embodiments, the ECC logic may be formed in the first flash controller or the second flash controller.

In some embodiments, the plurality of flash controllers may include a first flash controller and a second flash controller. A first block of a flash memory chip managed by the first flash controller and a second block of a flash memory chip managed by the second flash controller may organize a superblock. The router of the first flash controller may include a remapping table configured to, when the first block is changed to a third block of the flash memory chip managed by the first flash controller in the superblock, map an address of the first block to an address of the third block.

In some embodiments, during garbage collection, the plurality of flash controllers may write valid pages read from the plurality of flash memory chips to free blocks of the plurality of flash memory chips without passing through the system bus.

According to another embodiment of the present invention, a storage device controller configured to be connected to a flash memory device may be provided. The flash memory device may include a plurality of flash buses including a first flash bus and a second flash bus, and a plurality of flash memory chips including a plurality of first flash memory chips connected to the first flash bus and a plurality of second flash memory chips connected to the second flash bus. The storage device controller may include a plurality of flash controllers, a processing core, and a system bus. The plurality of flash controllers may include a first flash controller connected to the first flash bus and configured to manage the plurality of first flash memory chips, and a second flash controller connected to the second flash bus and configured to manage the plurality of second flash memory chips. The processing core may issue a command to the plurality of flash controllers. The system bus may connect the processing core and the plurality of flash controllers. The first flash controller may include a first router configured to perform communication with another flash controller among the plurality of flash controllers, and the second flash controller may include a second router configured to perform communication with another flash controller among the plurality of flash controllers.

According to yet another embodiment of the present invention, a copy-back operation method of a flash-based storage device may be provided. The flash-based storage device may include a plurality of flash memory chips, a plurality of flash buses each connected to corresponding flash memory chips among the plurality of flash memory chips, and a plurality of flash controllers respectively connected to the plurality of flash buses. The copy-back operation method may include issuing a read command to a source flash controller among the plurality of flash controllers, reading, by the source flash controller, a target page from a source flash memory chip among the plurality of flash memory chips through a source flash bus connected to the source flash controller among the plurality of flash buses, performing, by the source flash controller, error detection on the target page, and writing the target page to a free block in the plurality of flash memory chips.

DETAILED DESCRIPTION OF THE EMBODIMENTS

Figure 1:
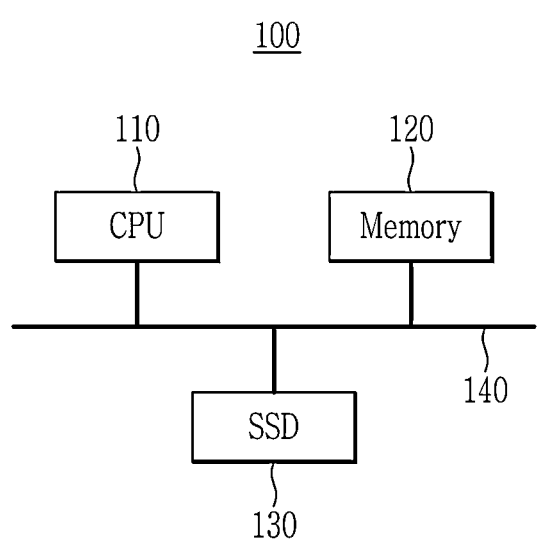
FIG. 1 is an example block diagram of a computing device according to an embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

As used herein, the singular forms "a" and "an" are intended to include the plural forms as well, unless the context clearly indicates otherwise.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

FIG. 1 is an example block diagram of a computing device according to an embodiment of the present invention.

Referring to FIG. 1, a computing device 100 includes a processor 110, a memory 120, and a storage device 130. FIG. 1 shows an example of the computing device, and the computing device may be implemented by various structures.

In some embodiments, the computing device may be any of various types of computing devices. The various types of computing devices may include a mobile phone such as a smartphone, a tablet computer, a laptop computer, a desktop computer, a multimedia player, a game console, a television, and various types of Internet of Things (IoT) devices.

The processor 110 performs various operations (e.g., operations such as arithmetic, logic, controlling, and input/output (I/O)) by executing instructions. The processor may be, for example, a central processing unit (CPU), a graphics processing unit (GPU), a microprocessor, or an application processor (AP), but is not limited thereto. Hereinafter, the processor 110 is described as a CPU 110.

The memory 120 is a system memory that is accessed and used by the CPU 110, and may be, for example, a dynamic random-access memory (DRAM). In some embodiments, the CPU 110 and the memory 120 may be connected via a system bus. A system including the CPU 110 and the memory 120 may be referred to as a host. The memory 120 may be referred to as a host memory.

The storage device 130 includes a storage medium and a controller. In some embodiments, the storage device 130 may be a flash-based storage device based on flash memory. For example, the storage device 130 may be a solid-state drive (SSD), a secure digital (SD) card, a universal serial bus (USB) flash drive, or the like. In following embodiments, the SSD, which is an example of the flash-based storage device, is described as the storage device 130. In this case, the storage medium may include a flash memory, for example, a NAND flash memory, and the controller may include an SSD controller.

In some embodiments, the SSD 130 may be connected to the host through an interface device 140. In some embodiments, the interface device 140 may include a host interface. In some embodiments, the host interface may be a block-based storage device interface, which may be, for example, a peripheral component interconnect express (PCIe) interface. In some embodiments, the interface device 140 may further include a root complex connecting the host and the SSD 130 in a PCIe system.

First, a conventional SSD is described with reference to FIG. 2, FIG. 3A, FIG. 3B, FIG. 3C, and FIG. 3D.

Figure 2:
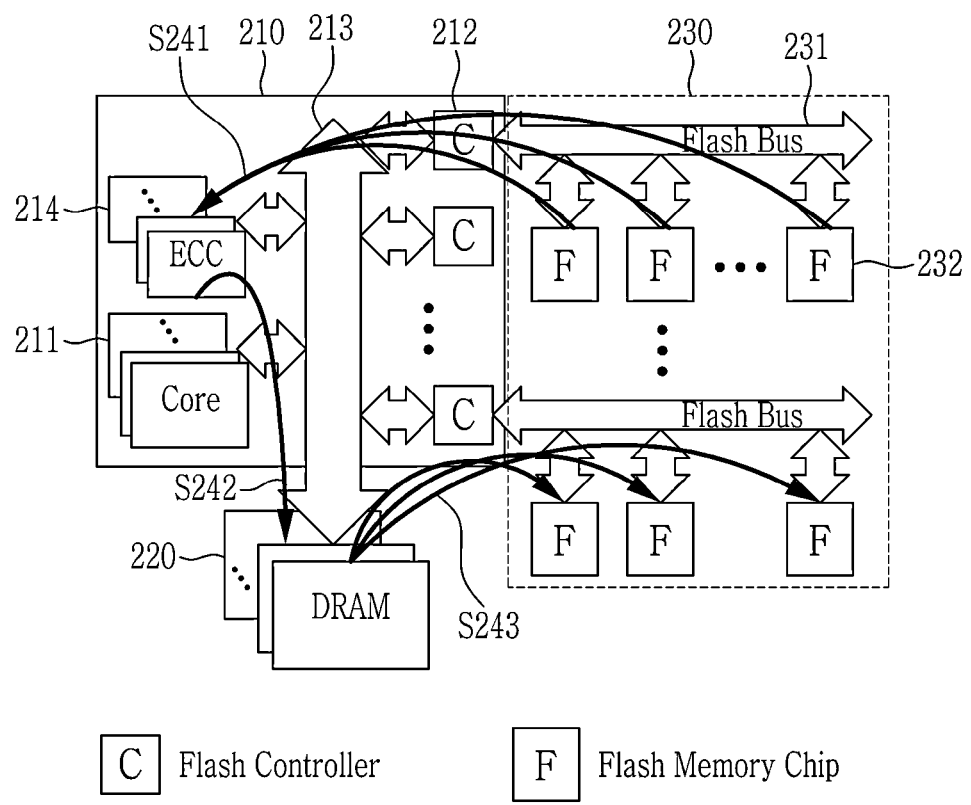
FIG. 2 is an example block diagram of a conventional SSD.
Figure 3A:
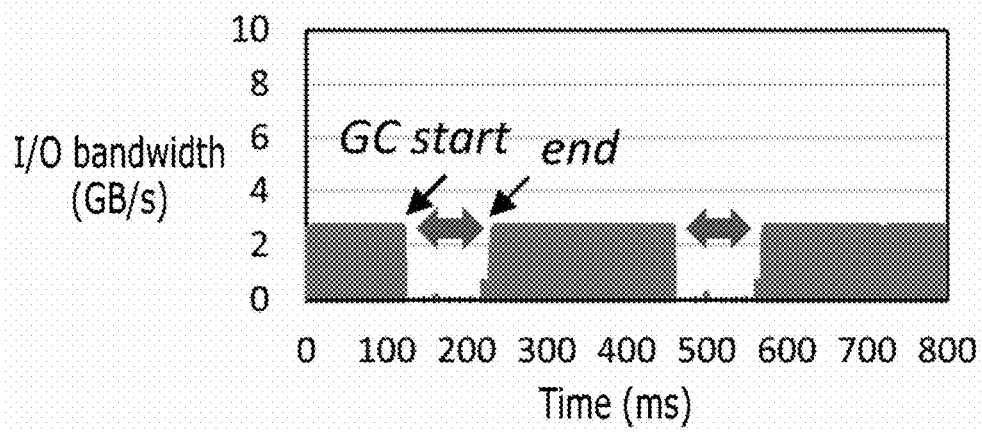
FIG. 3A is a diagram showing an I/O bandwidth of an SSD in a low bandwidth.
Figure 3B:
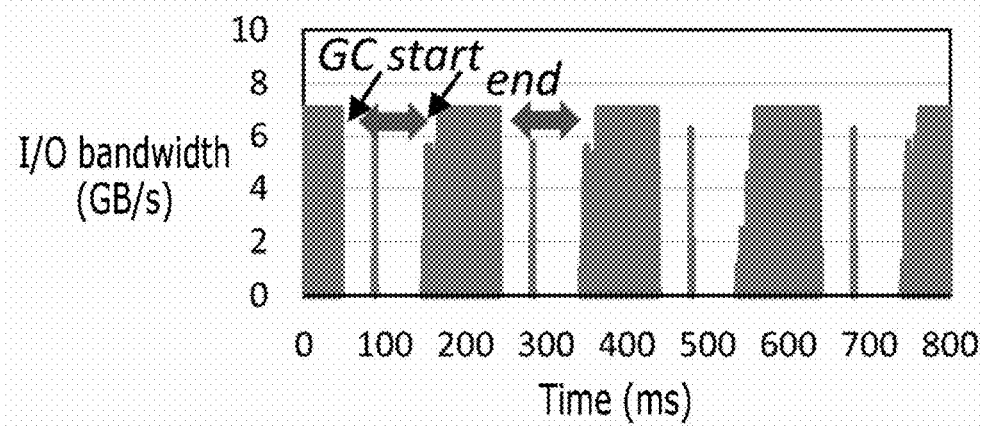
FIG. 3B is a diagram showing an I/O bandwidth of an SSD in a high bandwidth.
Figure 3C:
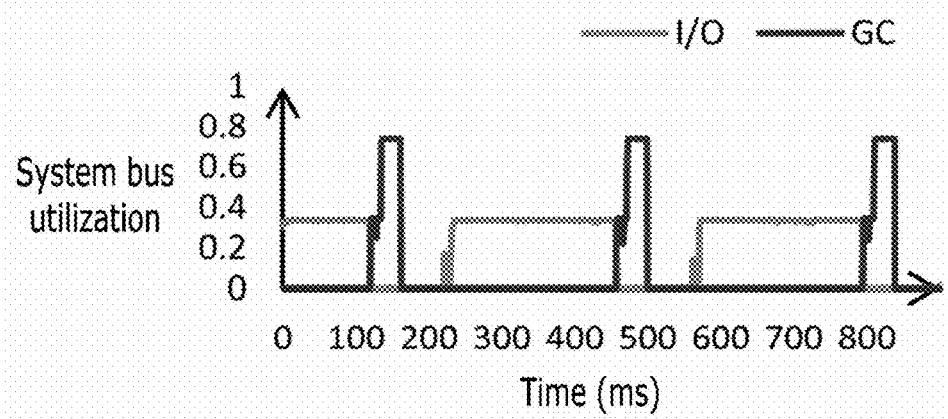
FIG. 3C is a diagram showing a system bus utilization rate of an SSD in a low bandwidth.
Figure 3D:
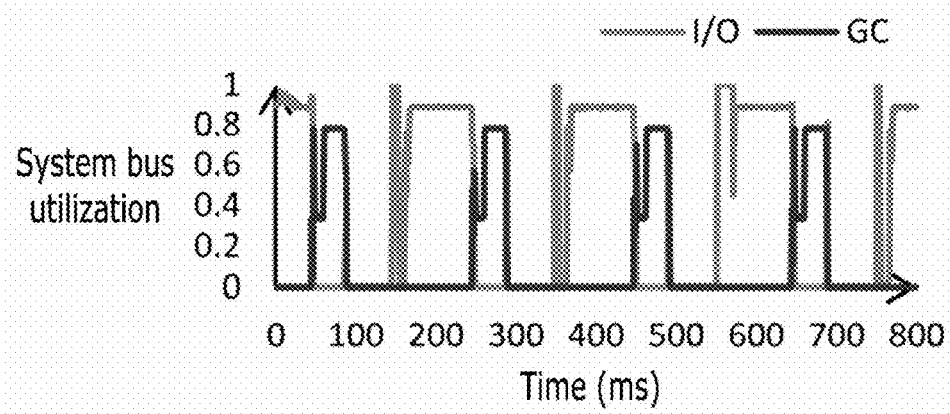
FIG. 3D is a diagram showing a system bus utilization rate of an SSD in a high bandwidth.

FIG. 2 is an example block diagram of a conventional SSD. FIG. 3A is a diagram showing an I/O bandwidth of an SSD in a low bandwidth, FIG. 3B is a diagram showing an I/O bandwidth of an SSD in a high bandwidth, and FIG. 3C is a diagram showing a system bus utilization rate of an SSD in a low bandwidth, and FIG. 3D is a diagram showing a system bus utilization rate of an SSD in a high bandwidth.

Referring to FIG. 2, an SSD 200 includes an SSD controller 210, an internal memory 220, and a flash memory device 230.

The SSD controller 210 includes processing cores 211, flash controllers 212, a system bus 213, and error correction code (ECC) logics 214. The internal memory 220 may be, for example, a dynamic random-access memory (DRAM). The processing cores 211, the flash controllers 212, the ECC logics 214, and the DRAM 220 are connected to each other through a system bus 213.

The flash memory device 230 includes flash buses 231 and flash chips 232. Each flash bus 231 is connected to some of the flash chips 232.

For data movement during garbage collection in the SSD 200, when the core 211 issues a read command to a target flash controller 212, the flash controller 212 sends the read command to an appropriate flash memory chip 232, reads a valid page from a target flash memory die, and transfers the read page to the ECC logic 214 through the system bus 213, at S241. The ECC logic 214 corrects an error when the error is detected in the read page. The core 211 writes the page that has gone through the ECC logic 214 to the DRAM 220 through the system bus 213 at S242. Next, the core 211 issues a write command to a target flash controller 212, and the flash controller 212 sends the write command to an appropriate flash memory chip 232 and writes the page to the flash memory die at S243.

In order to evaluate an impact of the garbage collection on I/O requests, results of observing changes in an I/O bandwidth by measuring the I/O bandwidth every 1 msec are shown in FIG. 3A and FIG. 3B. In FIG. 3A and FIG. 3B, an x-axis represents time, and a y-axis represents the I/O bandwidth defined as an amount of bandwidth provided to the I/O requests. Further, a synthetic workload consisting of 4 KB and 32 KB sequential write I/O requests with an outstanding request queue depth of 64 is used. In this case, the 4 kB access is used to evaluate a low bandwidth scenario shown in FIG. 3A since only one out of the eight planes are utilized. In comparison, the 32 kB access is used to evaluate a high bandwidth scenario shown in FIG. 3B since all the eight planes are utilized.

As shown in FIG. 3A, for the low bandwidth, initially, approximately 3 GB/s of I/O bandwidth is sustained but the I/O bandwidth drops after the garbage collection is triggered, and the limited number of I/O requests are processed during the garbage collection. As shown in FIG. 3B, a similar behavior is observed for the high bandwidth but the drop is more significant since the higher bandwidth of the flash memory is exploited. It is well known that the garbage collection interferes with the I/O requests, however, as the flash memory bandwidth increases in modern SSDs exploiting multi-plane, the impact of the system resources such as the system bus becomes more critical. To understand the impact of the system resources, results of observing a system bus utilization are shown in FIG. 3C and FIG. 3D. As shown in FIG. 3C and FIG. 3D, when the garbage collection is active, the system bus utilization for the I/O requests drops but the system bus utilization for the garbage collection increases. In particular, it can be seen that the system bus utilization drops significantly in the high bandwidth shown in FIG. 3D than in the low bandwidth shown in FIG. 3C. In other words, the system bus becomes a point of contention between the I/O requests and the garbage collection within the SSD.

Figure 4:
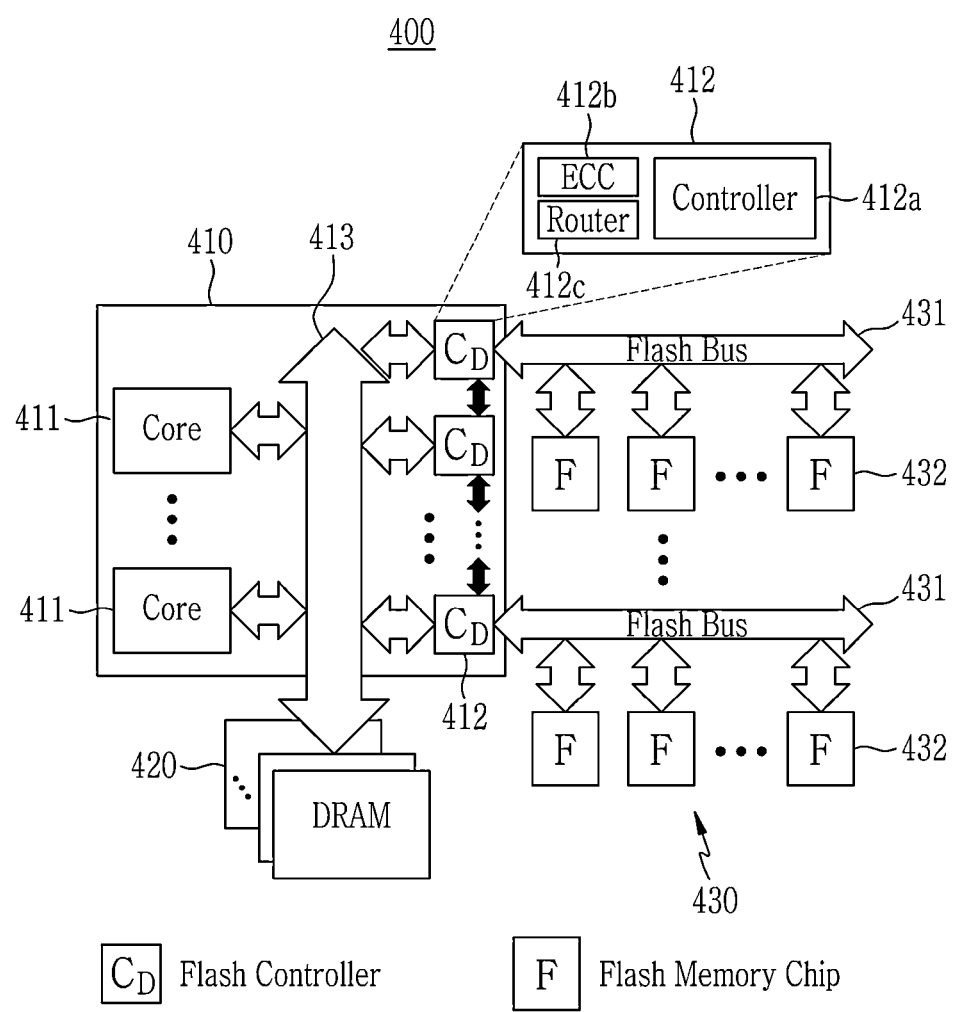
FIG. 4 is an example block diagram of an SSD according to an embodiment of the present invention.
Figure 5:
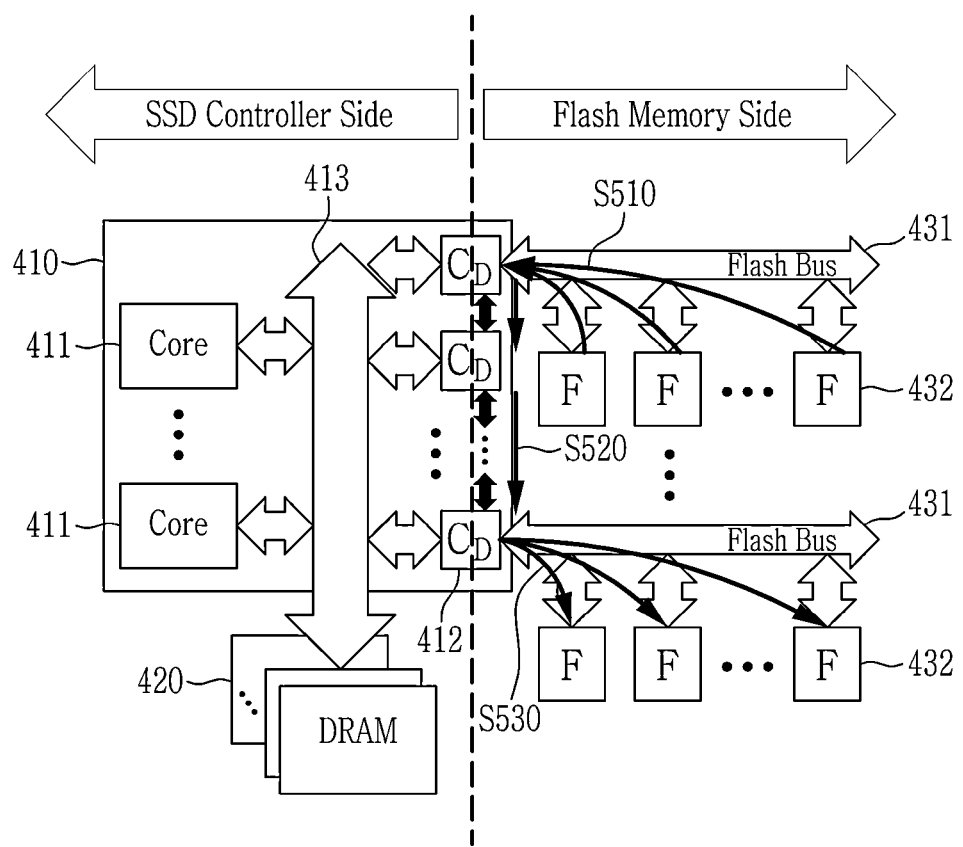
FIG. 5 is an example diagram showing an execution path of garbage collection in an SSD shown in FIG. 4.

FIG. 4 is an example block diagram of an SSD according to an embodiment of the present invention, and FIG. 5 is an example diagram showing an execution path of garbage collection in an SSD shown in FIG. 4.

Referring to FIG. 4, an SSD 400 includes an SSD controller (or a "storage device controller") 410 and a flash memory device 430. In some embodiments, the SSD 400 may further include an internal memory 420. In the SSD 400, a part of the SSD controller 410 may correspond to a front-end, and the flash memory device 430 may correspond to a back-end. The SSD controller 410 may be connected to a host through a host interface.

The SSD controller 410 includes a processing core 411 and a flash controller 412. The internal memory 420 may be, for example, a DRAM. In some embodiments, the SSD controller 410 may further include a system bus 413 connecting the processing core 411, the flash controller 412, and the DRAM 420 to each other. In some embodiments, the flash controller 412 may correspond to the back-end.

The flash memory device 430 includes a plurality of flash buses (or flash channels) 431 and a plurality of flash chips 432. Each flash bus 431 is connected to some of the flash chips 432. Each flash chip 432 may include one or more dies, and each die may include one or more planes.

The processing core 411 executes SSD firmware including various layers. The processing core 411 may include a plurality of cores to support parallel processing. The flash translation layer (FTL) of the SSD firmware translates a logical address of a high-level I/O request into a physical address of a low-level I/O request to process the I/O request, and sends the low-level I/O request (i.e., a command) to the flash controller 412. The DRAM 420 is used for data buffering between the host and the flash memory device 430. The DRAM 420 may also be used to maintain metadata of firmware running on the core 411. The flash controller 412 includes a plurality of flash controllers 412 that are connected to the plurality of flash buses 431, respectively. Each flash controller 412 is connected to a corresponding flash bus 431 among the plurality of flash buses 431.

Each flash controller 412 includes a flash controller logic 412a, an ECC logic 412b, and a router 412c.

The flash controller logic 412a manages data movement of the flash memory chip 432 connected to the corresponding flash bus 431. In some embodiments, the flash controller logic 412a may perform a function of a flash controller of a conventional SSD (e.g., an SSD shown in FIG. 2). The ECC logic 412b detects an error in read data (e.g., a page) and corrects the error if necessary. As shown in FIG. 4, the ECC logic 412b is integrated into the flash controller 412. Further, each flash controller 412 may include a router 412c (e.g., a hardware router) to enable communication among the flash controllers 412.

All the flash controllers 412 may reside on the same chip. In this case, to provide direct communication between the flash memory chips 432 in different flash bus channels, the chip on which the flash controllers 412 are formed may be connected by a separated network-on-chip (NoC) which is different from the system bus 213. The NoC is a network-based communication subsystem on a chip. Accordingly, the plurality of flash memory chips 432 may directly communicate through the flash controllers 412. Although a one-dimensional mesh topology is exemplified in FIG. 4 as the NoC topology for connecting the flash controllers 412, other NoC topologies may be used. For example, a ring topology or a higher-dimensional topology may be used. Although FIG. 4 shows that one router 412c per flash controller 412 (or flash bus 431) and one ECC engine 412b per router 412c are used, different numbers of routers 412c and/or ECC engines 412b may be used. For example, two or more routers 412c (i.e., two or more flash controllers 412) may share one ECC engine 412b.

In this case, as shown in FIG. 5, when the core 411 issues a read command to a source flash controller 412 for data movement during garbage collection in the SSD 400, the source flash controller 412 sends the read command to an appropriate flash memory chip 432 to read a valid page (target page) from a flash memory die at S510. The source flash controller 412 detects an error in the read page through the ECC logic 412b, corrects the error if necessary, and then sends the page to a destination flash controller 412 at S520. The destination flash controller 412 sends a write command to an appropriate flash memory chip 432 to write the transferred page to a flash memory die at S530.

As such, the flash memory device 430 (i.e., the back-end) is effectively decoupled from the front-end through the flash controller 412, so that the data movement within the flash memory device 430 can be decoupled from the data movement on the front-end side. Such an SSD may be referred to as a "decoupled SSD". Further, while the I/O requests and the garbage collection are handled at the same time, contention for shared resources, including the system bus 413 and the memory 420, can be reduced when pages are copied during the garbage collection. As a result, processing performance of the I/O requests as well as the garbage collection can be improved.

In some embodiments, the decoupled SSD may use a copy-back command, which is an advanced command that is difficult to use in an SSD because of error propagation. In other words, the front-end and the flash memory device 430 may be decoupled to allow the flash controllers 412 and the flash memory device 430 to perform a predetermined operation without utilizing the system resources including the system bus 413 and/or the DRAM 420. In some embodiments, the predetermined operation may include an operation using a copy-back command during garbage collection. Hereinafter, such an embodiment is described with reference to FIG. 6 to FIG. 10.

Figure 6:
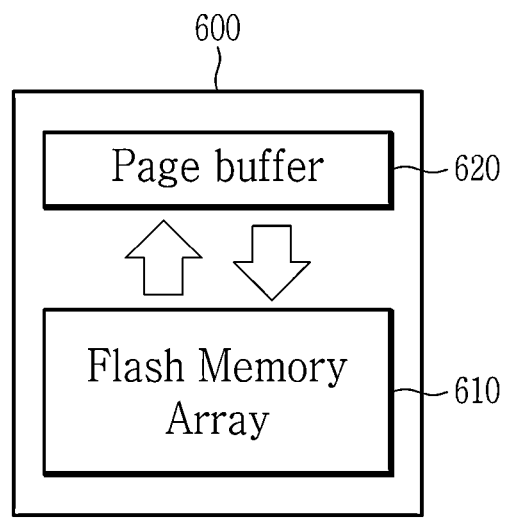
FIG. 6 is an example diagram showing a copy-back command in a conventional SSD.

FIG. 6 is an example diagram showing a copy-back command in a conventional SSD.

Referring to FIG. 6, the conventional SSD reads a page from a flash memory array 610 of a flash memory chip 600 for copy-back, stores the page in a page buffer 620 inside the flash memory chip 600, and directly writes the page stored in the page buffer 620 to another page (e.g., a page of a free block) of the flash memory array 610 again. As such, in the conventional SSD, data movement according to the copy-back is limited within the flash memory chip (particularly, a die). Accordingly, since the data movement does not go through an ECC logic (e.g., 214 of FIG. 2) existing outside the flash memory chip 600, error correction may be bypassed and the error may be propagated. Therefore, the copy-back command may be limited in the modern SSD that requires the ECC.

FIG. 7, FIG. 8, FIG. 9, and FIG. 10 each are an example diagram showing a copy-back operation in an SSD according to another embodiment of the present invention.

Figure 7:
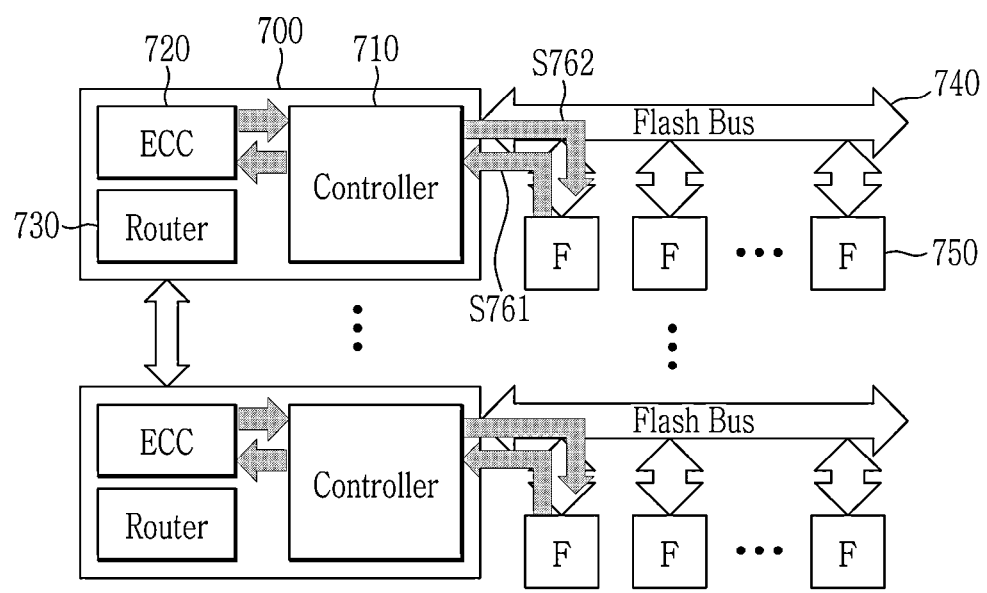
FIG. 7, FIG. 8, FIG. 9, and FIG. 10 each are an example diagram showing a copy-back operation in an SSD according to another embodiment of the present invention.

Referring to FIG. 7, as described with reference to FIG. 4, a flash controller 700 includes a flash controller logic 710, an ECC logic 720, and a router 730. A flash bus 740 is connected to the flash controller 700, and a plurality of flash memory chips 750 are connected to the flash bus 740.

A copy-back command from a core of an SSD controller, for example, an FTL is not directly sent to the flash memory chip 750, but is sent to the flash controller 700. The flash controller logic 710 of the flash controller 700 generates a series of read and write commands to an appropriate flash memory chip 750. The flash controller logic 710 issues the read command to the target flash memory chip 750, reads a valid page (target page) from the target flash memory chip (e.g., die) 750, and transfers the read page to the ECC logic 720 at S761. The ECC logic 720 performs error detection on the read page and corrects an error if necessary (e.g., if the error is detected). Next, the flash controller logic 710 sends the write command to the same flash memory chip 750 and writes the page passed through the ECC logic 720 to the flash memory chip 750 (e.g., die) at S762. In some embodiments, the page may be written to a free block of the flash memory chip 750. As such, since the source and the destination are the same flash memory chip, such copy-back is referred to as "local copy-back".

In the copy-back, the commands seen at the flash memory 750 are similar to commands (a read command followed by a write command) that are observed in a general SSD when the copy is performed. The key difference, however, is that the read command does not access the system resources, including the system bus and the DRAM.

Figure 8:
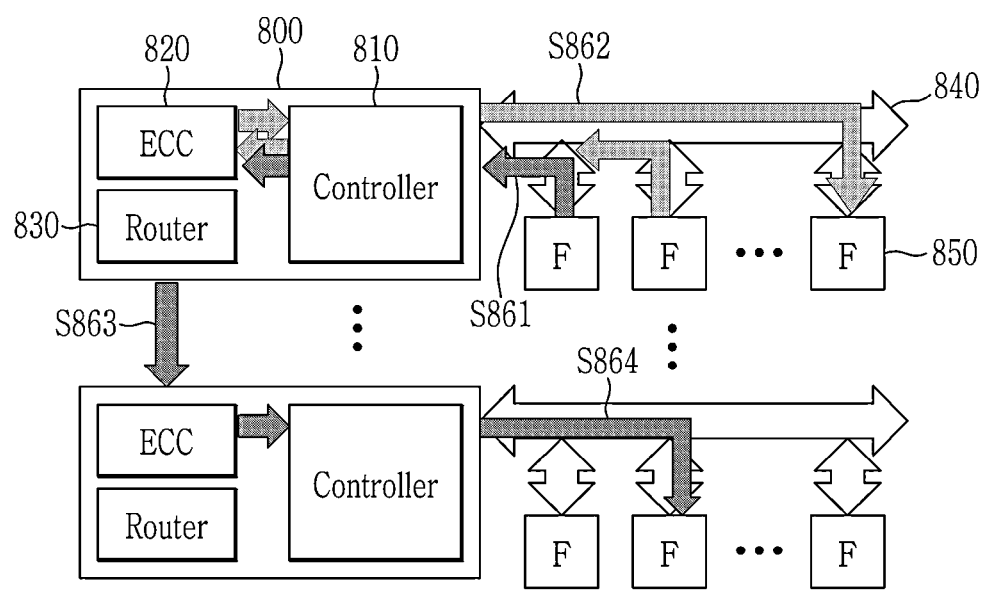

As shown in FIG. 8, the decoupled SSD supports copy-back in which the destination is not restricted to the same flash memory chip, and such copy-back is referred to as "global copy-back". A plurality of flash controllers 800 are provided in the SSD, and each flash controller 800 includes a flash controller logic 810, an ECC logic 820, and a router 830. Each flash controller 800 is connected to a flash bus 840 which is connected to a plurality of flash memory chips 850.

Referring to FIG. 8, a copy-back command from a core of an SSD controller, for example, an FTL is sent to a target flash controller 800 (i.e., a source flash controller 800). The flash controller logic 810 of the target flash controller 800 generates a series of read and write commands to an appropriate flash memory chip 850. The flash controller logic 810 issues the read command to the source flash memory chip 850, reads a valid page from the source flash memory chip (e.g., die) 850, and transfers the read page to the ECC logic 820 at S861. The ECC logic 820 performs error detection on the read page and corrects an error if necessary (e.g., if the error is detected).

When a destination flash memory chip 850 is connected to the same flash bus 840 as the source flash memory chip 850, the flash controller logic 810 of the target flash controller 800 sends the write command to the destination flash memory chip 850, writes the page passed through the ECC logic 820 to the flash memory chip (e.g., die) 850 at S862. In some embodiments, the page may be written to a free block of the flash memory chip 850. As such, when the source and the destination are other flash memory chips or dies 850 connected to the same flash bus 840, chip-to-chip (or die-to-die) communication may be utilized.

When the destination flash memory chip 850 is connected to the different flash controller 810 from the source flash memory chip 850, the destination memory controller 800 is different from the source flash controller 800. In this case, the router 830 of the source flash controller 800 sends the page passed through the ECC logic 820 to the router 830 of the destination flash controller 800 at S863, and the destination flash controller logic 810 sends the write command to the destination flash memory chip 850 to write the page to the flash memory chip (e.g., die) 850 at S864. In some embodiments, the page may be written to a free block of the flash memory chip 850. As such, if the destination is the flash memory chip 850 or die connected to the different flash bus 840 from the source, the page may be routed through on-chip interconnect of the NoC.

The main difference of the global copy-back, compared to the local copy-back, is the destination or the write address. As described in S862, if the destination is located on the same flash bus as the source, the write command is simply issued to the different flash chip on the same flash bus. However, when the destination and the source are located on different flash buses, the router 830 may packetize the read page (i.e., the page passed through the ECC logic 820) by appending destination information to a packet header, and route the packet to the router 830 of the destination flash controller 800 through the on-chip interconnect before the write command is issued.

Figure 9:
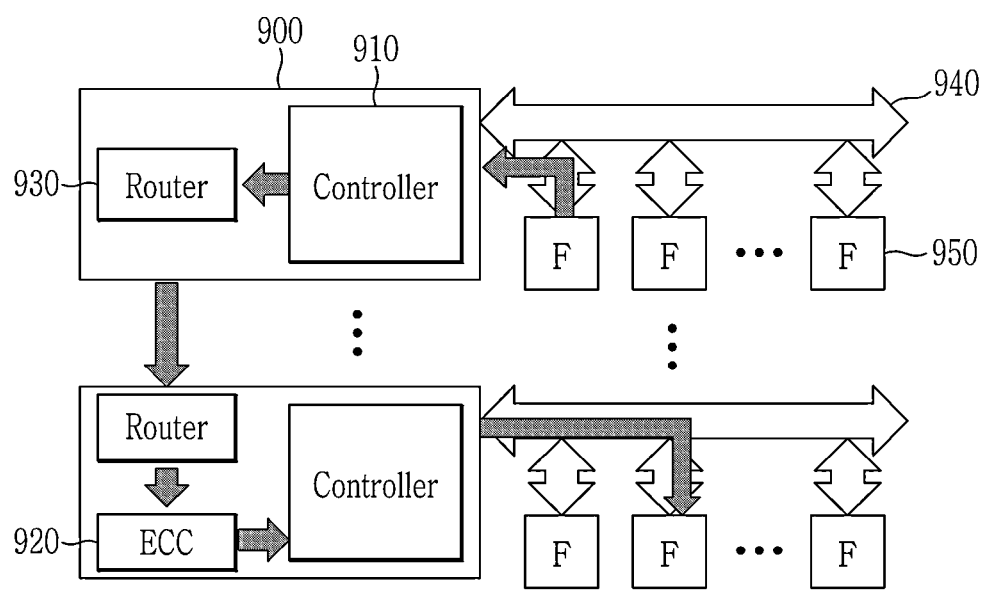

In some embodiments, as shown in FIG. 9, two or more flash controllers 900 may share one ECC logic 920. When a source flash controller 900 does not own an ECC logic 920, a flash controller logic 910 of the source flash controller 900 may read a page, and send the read page to a destination flash controller 900 through a router 930. Then, the ECC logic 920 of the destination flash controller 900 may perform error detection on the received page. In some embodiments, when the flash controller 900 that does not own the ECC logic 920 performs intra-chip page movement or inter-chip page movement, the flash controller 900 may send the read page to another flash controller owning the ECC logic 920 through the router 930, and receive the page passed through the ECC logic 920 again.

Figure 10:
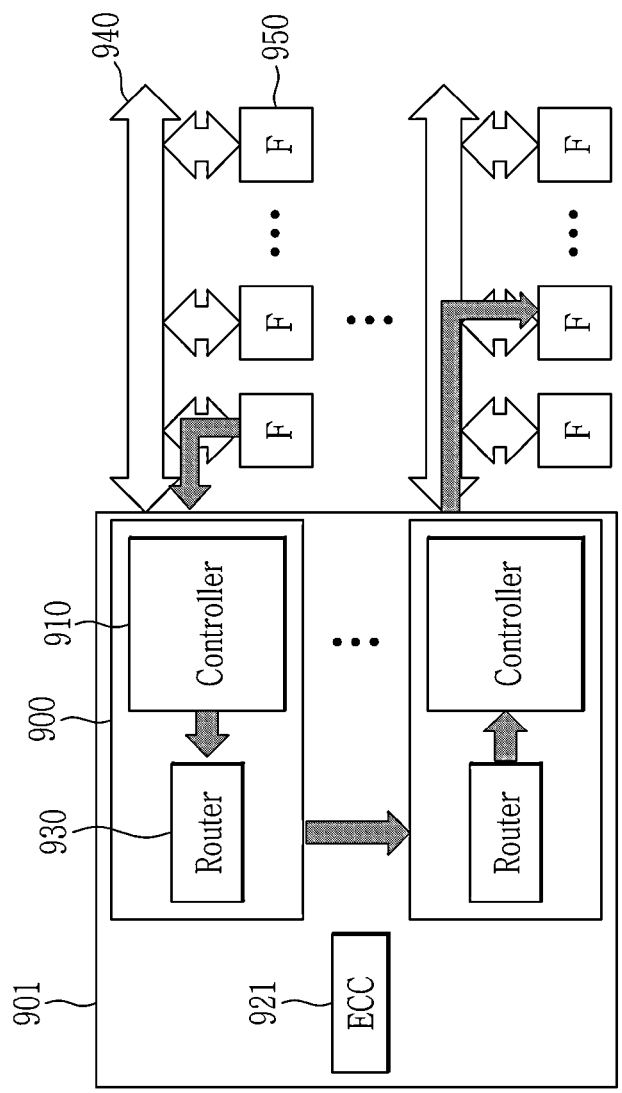

In some embodiments, as shown in FIG. 10, an ECC logic 921 shared by two or more flash controllers 900 may be formed in a chip 901 including the flash controllers 900. In this case, each flash controller 900 may perform error detection or error correction through the ECC logic 921 formed in the chip 901.

As such, the decoupled SSD can provide the FTL with more flexibility in terms of free block selection (i.e., destination selection of the copy) during the garbage collection by providing the global copy-back. Meanwhile, the intra-chip and inter-chip reliability variance among the flash memory chips may vary significantly. Thus, the global copy-back may enable more flexibility and multiple destination options during a write phase of the copy-back, and enable better balancing of the number of pages copied by the garbage collection. As a result, it is possible provide a balanced endurance across the different flash memories during the garbage collection, by leveraging the global copy-back commands in the garbage collection.

Next, an embodiment in which a decoupled SSD is applied to a superblock is described with reference to FIG. 11 and FIG. 12.

Figure 11:
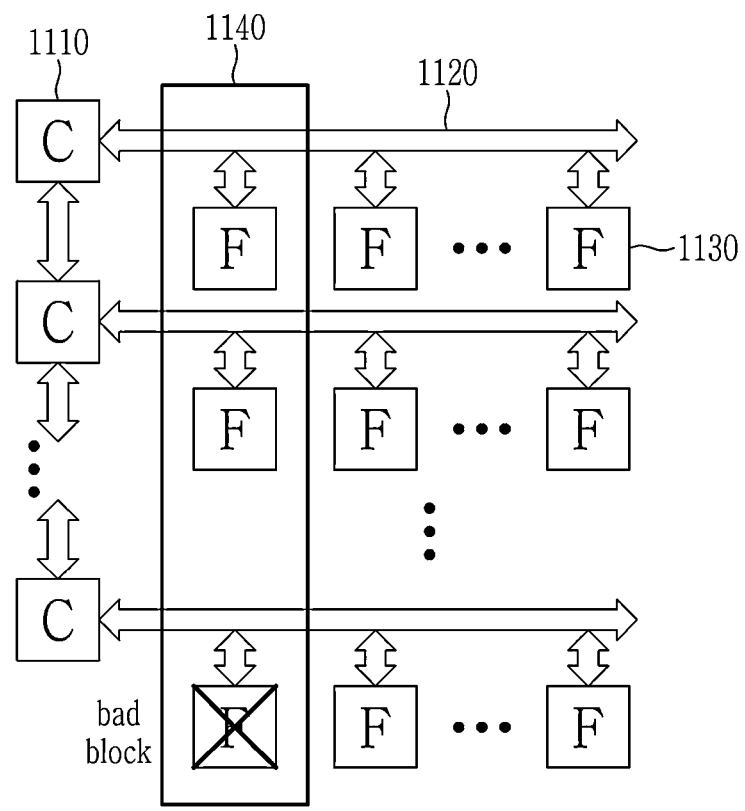
FIG. 11 is an example diagram showing a static superblock in an SSD according to yet another embodiment of the present invention.
Figure 12:
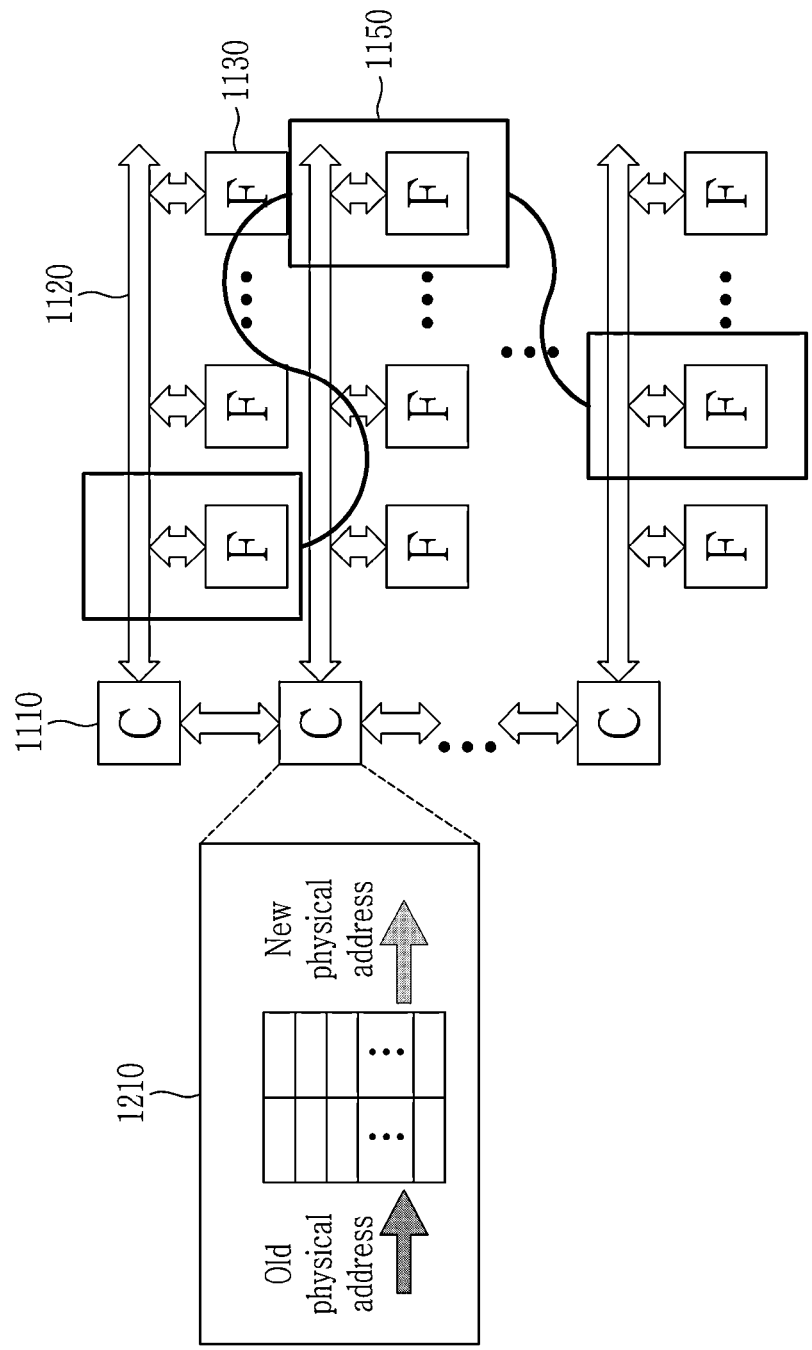
FIG. 12 is an example diagram showing a dynamic superblock in an SSD according to still another embodiment of the present invention.

FIG. 11 is an example diagram showing a static superblock in an SSD according to yet another embodiment of the present invention, and FIG. 12 is an example diagram showing a dynamic superblock in an SSD according to still another embodiment of the present invention.

An SSD may reduce a size of a mapping table in an FTL by organizing a plurality of physical blocks as superblocks. As shown in FIG. 11, the SSD forms the superblock by arranging the plurality of physical blocks across chips 1130 of different channels 1120 to exploit parallelism of flash channels (flash buses) 1120 to form a superblock 1140. Identifiers (IDs) of the physical blocks across the different flash channels 1120 may be the same in order to minimize the complexity of the superblock 1140. Since the physical blocks across the different chips 1130 may have different endurance, the entire super block 1140 may not be used if one of the blocks fails.

Referring to FIG. 12, in some embodiments, a router of a flash controller 1110 may include a remapping table 1210. Therefore, when a failure occurs in a physical block of the static superblock 1140 shown in FIG. 11, another block (i.e., new physical block) of the flash bus 1120 to which the chip 1130 including the bad physical block (i.e., previous physical block) in which the failure occurs is connected may be used. The remapping table of the flash controller 1110 may map an address of the previous physical block of the flash memory chip 1130 managed by the flash controller 1110 to an address of the new physical block. Accordingly, as shown in FIG. 12, some physical blocks among the previous physical blocks are replaced with new physical blocks, so that the superblock 1150 can be reorganized. Such dynamic superblock mapping may be supported without changing the existing FTL. As a result, the decoupled SSD may be extended to improving flash memory endurance and management.

In some embodiments, the effectiveness of the flash-based storage device or copy-back operation method described above may be described in a paper published by the inventor (Jiho Kim et al., "Decoupled SSD: Reducing Data Movement on NAND-Based Flash SSD," IEEE Comput. Archit. Lett. 20(2): 150-153 (2021)).

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A flash-based storage device comprising:
a flash memory device comprising a plurality of flash buses and a plurality of flash memory chips, wherein each of the plurality of flash buses is connected to two or more flash memory chips among the plurality of flash memory chips;
a front-end connected to a host through a host interface and comprising a processing core; and
a plurality of flash controllers that are connected to the plurality of flash buses, respectively, wherein each of the plurality of flash controllers comprises:
a flash controller logic configured to perform a read operation or a write operation in a flash memory chip connected to a corresponding flash bus among the plurality of flash buses; and
a router configured to perform communication with another flash controller among the plurality of flash controllers,
wherein the front-end further comprises a system bus configured to connect the processing core and the plurality of flash controllers, and
wherein the plurality of flash controllers are connected by a network-on-chip (NoC) without passing through the system bus.

2. The flash-based storage device of claim 1,
wherein the front-end and the flash memory device are decoupled to allow the flash controllers and the flash memory device to perform a predetermined operation without utilizing a system resource including the system bus.

3. The flash-based storage device of claim 2, wherein the predetermined operation comprises an operation using a copy-back command during garbage collection.

4. The flash-based storage device of claim 1, wherein each of the plurality of flash controllers further comprises an error correction code (ECC) logic configured to perform error detection or error correction on a page read by the flash controller logic.

5. The flash-based storage device of claim 4, wherein in response to the processing core issuing a copy-back command to a target flash controller among the plurality of flash controllers during garbage collection,
the flash controller logic of the target flash controller is configured to read a target page from a target flash memory chip among the plurality of flash memory chips,
the ECC logic of the target flash controller is configured to perform the error detection on the target page, and
the flash controller logic of the target flash controller is configured to write the target page to a free block of the target flash memory chip.

6. The flash-based storage device of claim 4, wherein in response to the processing core issuing a copy-back command to a target flash controller among the plurality of flash controllers during garbage collection,
the flash controller logic of the target flash controller is configured to read a target page from a source flash memory chip among the plurality of flash memory chips,
the ECC logic of the target flash controller is configured to perform the error detection on the target page, and
the flash controller logic of the target flash controller is configured to write the target page to a free block of a destination flash memory among the plurality of flash memory chips.

7. The flash-based storage device of claim 4, wherein in response to the processing core issuing a copy-back command to a source flash controller among the plurality of flash controllers during garbage collection,
the flash controller logic of the source flash controller is configured to read a target page from a source memory chip among the plurality of flash memory chips,
the ECC logic of the source flash controller is configured to perform the error detection on the target page,
the router of the source flash controller is configured to send the target page to the router of a destination flash controller among the plurality of flash controllers, and
the flash controller logic of the destination flash controller is configured to write the target page to a free block of a destination flash memory chip among the plurality of flash memory chips.

8. The flash-based storage device of claim 7, wherein the router of the source flash controller is configured to packetize the target page to generate a packet, and send the packet to the router of the destination flash controller.

9. The flash-based storage device of claim 1, wherein the plurality of flash controllers comprise a first flash controller and a second flash controller, and
wherein the flash-based storage device further comprises an ECC logic configured to be shared by the first flash controller and the second flash controller, and perform error detection or error correction on a page read by the first flash controller logic or the second flash controller logic.

10. The flash-based storage device of claim 9, wherein the ECC logic is formed in the first flash controller or the second flash controller.

11. The flash-based storage device of claim 1, wherein the plurality of flash controllers comprise a first flash controller and a second flash controller,
wherein a first block of a flash memory chip managed by the first flash controller and a second block of a flash memory chip managed by the second flash controller organize a superblock, and
wherein the router of the first flash controller comprises a remapping table configured to, when the first block is changed to a third block of the flash memory chip managed by the first flash controller in the superblock, map an address of the first block to an address of the third block.

12. A storage device controller configured to be connected to a flash memory device comprising a plurality of flash buses comprising a first flash bus and a second flash bus, and a plurality of flash memory chips comprising a plurality of first flash memory chips connected to the first flash bus and a plurality of second flash memory chips connected to the second flash bus, the storage device controller comprising:
a plurality of flash controllers comprising a first flash controller connected to the first flash bus and configured to manage the plurality of first flash memory chips, and a second flash controller connected to the second flash bus and configured to manage the plurality of second flash memory chips;
a processing core connected to a host through a host interface and configured to issue a command to the plurality of flash controllers; and
a system bus configured to connect the processing core and the plurality of flash controllers,
wherein the first flash controller comprises a first router configured to perform communication with another flash controller among the plurality of flash controllers, and the second flash controller comprises a second router configured to perform communication with another flash controller among the plurality of flash controllers, and wherein the plurality of flash controllers are connected by a network-on-chip (NoC) without passing through the system bus.

13. The storage device controller of claim 12, wherein the first flash controller further comprises a first error correction code (ECC) logic configured to perform error detection or error correction on a page read from the plurality of first memory chips, and wherein the second flash controller further comprises a second ECC logic configured to perform error detection or error correction on a page read from the plurality of second memory chips.

14. The storage device controller of claim 12, wherein the first flash controller and the second flash controller share an ECC logic configured to perform error detection or error correction.

15. A copy-back operation method of a flash-based storage device comprising a plurality of flash memory chips, a plurality of flash buses each connected to corresponding flash memory chips among the plurality of flash memory chips, and a plurality of flash controllers respectively connected to the plurality of flash buses, the method comprising:

issuing a first read command to a first source flash controller among the plurality of flash controllers;

reading, by the first source flash controller, a first target page from a first source flash memory chip among the plurality of flash memory chips through a first source flash bus connected to the first source flash controller among the plurality of flash buses;

performing, by the first source flash controller, error detection on the first target page;

when a first free block is located on a flash memory chip connected to a destination flash bus that is different from the first source flash bus among the plurality of flash memory chips, sending, by the first source flash controller, the first target page to a destination flash controller among the plurality of flash controllers; and writing, by the destination flash controller, the first target page to a second free block through the destination flash bus.

16. The method of claim 15, further comprising:

issuing a second read command to a second source flash controller among the plurality of flash controllers;

reading, by the second source flash controller, a second target page from a second source flash memory chip among the plurality of flash memory chips through a second source flash bus connected to the second source flash controller among the plurality of flash buses;

performing, by the second source flash controller, error detection on the first target page;

when the second free block is located on a flash memory chip connected to the second source flash bus among the plurality of flash memory chips, writing, by the second source flash controller, the second target page to the second free block through the second source flash bus.

17. The method of claim 15, wherein the sending, by the first source flash controller, the first target page comprises packetizing the first target page to generate a packet, and sending the packet to the destination flash controller.

* * * * *